United States Patent [19]

Mispreuve et al.

[11] Patent Number: 5,484,820
[45] Date of Patent: Jan. 16, 1996

[54] POLYURETHANE FOAM FOR PACKAGING APPLICATIONS

[75] Inventors: Henri L. S. A. Mispreuve; Simon Waddington, both of Prangins; Ulrich Tribelhorn, Ebikon, all of Switzerland

[73] Assignee: The Dow Chemical Company, Midland, Mich.

[21] Appl. No.: 286,293

[22] Filed: Aug. 5, 1994

[51] Int. Cl.⁶ .............................. C08G 18/06; C08G 18/08
[52] U.S. Cl. ............................ 521/174; 521/137; 521/155
[58] Field of Search .................................. 521/155, 174, 521/137

[56] References Cited

U.S. PATENT DOCUMENTS 4,374,934  2/1983  Raynor ..................................... 521/174

Primary Examiner—Morton Foelak

[57] ABSTRACT

Disclosed is a water-blown methylene diphenylisocyanate-based polyurethane foam for use in packaging of shock or vibration sensitive goods, and a process for its manufacture from a particular polyol composition. The polyurethane foam exhibits a broad shock/vibration attenuation profile rendering it especially suitable for packaging of light weight articles.

12 Claims, No Drawings

POLYURETHANE FOAM FOR PACKAGING APPLICATIONS

BACKGROUND OF INVENTION

This invention relates to a cellular polyurethane, the preparation thereof, and its use in packaging of fragile or delicate articles.

Fragile or delicate articles including, for example, electronic instruments, delicate glass, and shock sensitive chemicals require special protection if they are not to be damaged when transported or stored. A well-known practice is to employ a cellular, shock absorbing plastic packaging material, such as polystyrene or polyurethane foam, to encapsulate and support the article within the confines of a rigid or semirigid box or enclosure. Such techniques are disclosed in, for example, U.S. Pat. Nos. 2,897,641; 3,190,422; 3,173,535; 3,415,364 and 3,750,871. When polyurethane foam is selected as the packaging material, it is typically a rigid or semirigid polyurethane foam having a density of from about 8 to about 15 kilograms per cubic meter. While rigid or semirigid packaging foam functions to restrict the physical movement of the packaged article, it is frequently observed that its ability to attenuate impact shocks and vibrations does not always satisfy the demands of industry.

As an alternative, flexible or semi-flexible polyurethane foam, recognized as having better sound and vibration attenuation properties, may be considered for use in packaging applications. However, the load bearing characteristics of such foam does not always satisfy the demands of industry for the packaging of the sensitive articles. Accordingly it would be desirable to develop a polyurethane foam for use in packaging applications that can effectively attenuate impact shocks and vibrations and which has attractive load bearing properties. Further to improving such properties, it would also be desirable if such foam could exhibit an enhanced fatigue resistance. Foam having an enhanced fatigue resistance would allow it to be considered for reuse in the packaging application without it having to be immediately scrapped.

In addition to the above-mentioned desired performance requirements, it would be desirable if the polyurethane foam could be prepared by a process having none or little volatile emissions to the environment of substances considered as environmentally undesirable. Particularly, it would be desirable to avoid the use of certain halogenated blowing agents considered as being aggressive to the ozone content of the earths' atmosphere.

SUMMARY OF THE INVENTION

To accommodate the above desires, Applicants have developed an alternative polyurethane foam that is particularly suitable for the packaging of delicate or fragile articles. The susceptibility of such articles to shock or vibration damage can be expressed in terms of a G-factor By the term "fragile" it is generally understood articles which are susceptible to damage when exposed to a G-factor of from about 20G to about 40G; by the term "delicate", it is understood articles which are susceptible to damage when exposed to a G-factor of more than 40G and up to about 100G. An article is considered to be more susceptible to damage the lower its G-factor. Accordingly, if polyurethane foam is to be used as packaging material such foam should sufficiently limit the exposure of the article to the potentially damaging G-force.

In a first aspect, this invention relates to a cellular polyurethane polymer having an open or interconnecting cellular structure, an overall density of from about 15 to about 50 kg/m$^3$ and, based on a thickness of 75 mm, a G-value of about 75 or less at a static stress greater than or equal to about 0.4 psi (2.75 kPa).

In a second aspect, this invention relates to a process for preparing a cellular polyurethane polymer having an open or interconnecting cellular structure, an overall density of from about 15 to about 50 kg/m$^3$ and, based on a thickness of 75 mm, a G-value of about or less at a static stress greater than or equal to about 0.4 psi (2.75 kPa), which comprises reacting a polyisocyanate with a polyether polyol composition in the presence of water, wherein:

(a) the polyether polyol composition, based on total parts by weight of (i) and (ii) present, comprises:
  (i) from about 25 to about 65 percent of a polyether polyol that has an average of from about 2 to about 4 hydroxyl groups/molecule and an equivalent weight of from about 150 to about 500; and
  (ii) from about 35 to about 75 percent of a polyether polyol that has an average of from about 2 to about 6 hydroxyl groups/molecule, an equivalent weight of from about 600 to about 3,000, and an oxyethylene content of at least 50 weight percent;

(b) the water is present in an amount of from about 1 to about 8 parts per 100 parts by weight of the polyether polyol composition;

(c) the polyisocyanate, being present in an amount sufficient to provide an isocyanate reaction index of from about 50 to about 150, has an average isocyanate functionality of from about 2.3 to about 3.5 and comprises methylene diphenylisocyanate and at least 40 weight percent polymethylene polyphenylisocyanate.

In a third aspect, this invention is a method for packaging fragile articles with a cellular, shock absorbing material wherein the material used is a polyurethane foam as mentioned above, preferably obtained according to the above mentioned process.

DETAILED DESCRIPTION OF THE PREFERRED EMBODIMENTS

The open-celled polyurethane foam product of this invention has an overall average density of from about 15 to about 50, preferably from about 20 to about 40, and more preferably from about 25 to about 35 kg/m$^3$. An open-celled foam provides for attractive dimensional stability, not always exhibited by a closed-celled foam, which is highly desirable when such foam is to be used for packaging applications. The foam of the present invention additionally can be characterized in that, for a sample having a thickness of 75 mm, it exhibits a G-value of about 75 or less at a static stress of greater than or equal to about 0.4 psi (2.75 kPa), preferably about 60 or less at a static stress of greater than or equal to about 0.3 psi (2 kPa), and more preferably about 50 or less at a static stress greater than or equal to about 0.3 psi (2 kPa). By the expression "G-value", it is understood that the foam has the ability to sufficiently attenuate shock and vibrations such that the packaged article under normal circumstances is unlikely to be exposed to a G-force greater than this numerical value. The higher the foam G-value the less suitable it might be for the packaging of fragile or delicate articles. Advantageously, the foam of the invention exhibits a G-value of from about 20G to about 75G at a static stress of from about 0.4 to about 1.5 psi (about 2.75 to about 9.65 kPa), and preferably a value of from about 20G to about 50G at a static stress of from about 0.3 to about 1.5 psi (about 2 to about 9.65 kPa). Such G-value can be determined by conventional test procedure including BS7539 (1992) Section 2, Method 1 in which selected weights are dropped from a specified height onto a foam sample of a given thickness. It is to be noted that as the thickness of the foam sampled is reduced, the observed G-value becomes higher. It is for this reason that the G-value of different foams, if to be meaningfully compared, should be determined from samples having similar cell orientation and sample thickness.

It is presently considered that the attractive shock transmission attenuation properties exhibited by the foam are to be associated with the glass transition temperature of the polyurethane polymer, with it being advantageous to have a polymer with a glass transition temperature which approximates the operational, frequently ambient, temperature range where the foam may be deployed in application. For this purpose, the foam of the invention advantageously exhibits a glass transition temperature in the range of from about $-40°$ C. to about $+60°$ C., preferably from about $-10°$ C. to about $+55°$ C., and more preferably from about $0°$ C. to about $+50°$ C.

The polyurethane foam of the present invention can be prepared by reacting a certain polyether polyol composition with a certain polyisocyanate composition in the presence of a blowing agent comprising water.

The Polyether Polyol Composition

The polyether polyol composition, based on total parts by weight of first and second component present, comprises: as first component, from about 25 to about 65 percent of a polyether polyol that has an average of from about 2 to about 4 hydroxyl groups/molecule and an equivalent weight of from about 150 to about 500; and as second component, from about 35 to about 75 percent of a polyether polyol that has an average of from about 2 to about 6 hydroxyl groups/molecule, an equivalent weight of from about 600 to about 3,000, and an oxyethylene content of at least 50 weight percent.

The first component advantageously is present in an amount of preferably from about 30, and more preferably from about 35; and preferably up to about 60 weight percent. The polyether polyol present as first component, preferably has a hydroxyl equivalent weight of from about 200, more preferably from about 250; and preferably up to about 450, more preferably up to about 400. Such polyether polyol preferably contains an average of from about 2.5 to about 3.6 hydroxyl groups per molecule. Polyether polyols corresponding to this description are used in the process of the present invention for the purpose of providing a desired glass transition of the final polymer. Suitable polyether polyols for use as first component include those polyols obtained by reacting an alkylene oxide, such as for example ethylene oxide, propylene oxide, butylene oxide or mixtures of two or more such oxides, with an active hydrogen-containing initiator. Typical initiators include water, alkylene glycols such as propylene glycol, glycerine, trimethylolpropane, ethylenediamine and the like. Representative of suitable commercially available polyether polyol products include those designated as VORANOL™ CP 260, VORANOL™ CP 450, VORANOL™ CP 700 and VORANOL™ CP 1000, all available from The Dow Chemical Company.

The second polyether polyol component, distinguished by its higher hydroxyl equivalent weight and oxyethylene content, is present for the purpose of enhancing compatibility of the polyol composition with the water, and for imparting to the final foam product an open-celled structure. For this purpose, the second component advantageously is present in an amount of preferably from about 40; and preferably up to about 70, more preferably up to about 65 weight percent. The second polyol component preferably has a hydroxyl equivalent weight of from about 800, more preferably from about 1000; and preferably up to about 2500, more preferably up to about 2000. The oxyethylene content of the second polyol component preferably is at least 60, and more preferably at least 70; and preferably up to about 90 percent by total weight of the second polyol. Suitable polyether polyols for use as the second component include those polyols obtained by reacting an alkylene oxide including ethylene oxide, and optionally propylene oxide, butylene oxide or mixtures of two or more such oxides, with an active hydrogen-containing initiator. Typical initiators include water, alkylene glycols such as propylene glycol, glycerine, trimethylolpropane, ethylenediamine, pentaerythritol, sorbitol and the like. Representative of suitable commercially available polyether polyol products include those designated as VORANOL™ CP 1421 and VORANOL™ 4053, both available from The Dow Chemical Company.

When it is desired to enhance the load bearing properties of the polyurethane, advantageously present when preparing the foam is a particulate organic polymer. Suitable particulate organic polymers for this purpose include styrene:acrylonitrile (SAN), polyurea (PHD), polyisocyanate-polyamine (PIPA) and styrene-butadiene (SB) type polymers. The particulate organic polymer, when used, advantageously is present in an amount of from about 0.5 to about 15, preferably from about 1 to about 12, and more preferably from about 2 to about 10 parts per 100 parts by weight of the total polyether polyol composition. When the particulate organic polymer is an SB polymer, this can advantageously be introduced to the foaming process, optionally preblended with the polyol composition, by way of an aqueous latex where the water serves in a blowing capacity. Suitable aqueous styrene-butadiene latexes are available commercially and include those from Goodyear designated as LPF 6733A, LPF 6758A and products available from Enichem including those designated as INTEX 2003 and INTEX 132. When the particulate organic polymer is a styrene:acrylonitrile (SAN), polyurea (PHD) or polyisocyanate-polyamine (PIPA) polymer, such can be introduced by way of suspension in a polyether polyol optionally different from the first or second polyether polyol components, such polymer polyether polyol systems are available commercially. Exemplary of suitable, and preferred, commercially available SAN polymer polyols include those sold by The Dow Chemical Company and include the products designated as VORALUX™ in conjunction with the designation codes HN200 through to HN206, HL100 to HL400.

The Blowing Agent

As mentioned, the foam of this invention is prepared in the presence of from about 1 to about 8, preferably from about 2.5 to about 8, and more preferably from about 3.5 to about 6.5 parts, per 100 parts by total weight of the polyol composition, of water. The water reacts with polyisocyanate leading to the formation of carbon dioxide which then functions as blowing agent providing the final polymer with a reduced density. The blowing capacity provided by water may be supplemented by physical blowing agents. Exemplary of such physical blowing agents include fluorocarbons and chlorofluorocarbons such as, for example, dichlorotrifluoroethane (R-123), dichlorofluoroethane (R-141a), chlorodifluoroethane (R-142b), tetrafluoroethane (R-134a), and chlorodifluoromethane (R-22); hydrocarbons such as butane, pentane, cyclopentane, hexane and cyclohexane; and entrained gases such as air, argon, nitrogen and carbon dioxide. Carbon dioxide may also be introduced by way of thermal decomposition, from the polyurethane reaction exotherm, of, for example, amine/carbon dioxide adducts. In a highly preferred embodiment of this invention, the blowing agent consists of water.

The Polyisocyanate

The polyisocyanate used to prepare the foam of this invention has an average isocyanate functionality of from about 2.3 to about 3.5, preferably from about 2.5 to about 3.2, and more preferably from about 2.7 to about 3.1, and comprises methylene diphenylisocyanate and a polymethylene polyphenylisocyanate. The polymethylene polyphenylisocyanate is present in an amount of at least 40, preferably at least 50, more preferably at least 55, and preferably up to about 80 percent, based on total weight of the polyisocyanate composition. The methylene diphenylisocyanate generally is a mixture of the 2,4'- and 4,4'-isomers, advantageously such isomers are present in a weight ratio of from about 98:2 to about 50:50. The total amount of polyisocyanate used to prepare the polyurethane foam should be sufficient to provide an isocyanate reaction index of typically from about 50 to about 150, preferably from about 65, more preferably from about 70, and preferably up to about 130, more preferably up to about 120, and most preferably up to about 95. An isocyanate reaction index of 100 corresponds to one isocyanate group per isocyanate reactive hydrogen atom present from the water and the polyol composition.

Further to the above-mentioned constituents, optionally present in the foaming process are other substances including urethane promoting catalyst, foam stabilizing agents, flame retardants, and antistatic agents such as, for example, STATURE™ II available from The Dow Chemical Company. Foam stabilizing agents include silicon surfactants, for example, siloxane-oxyalkylene copolymers such as products sold under the trademark TEGOSTAB by Th. Goldschmidt including BF-2370 and B-4900, and products sold by OSi including the product designated as L620. Suitable catalysts which may be used to promote the formation of urethane groups include tertiary amines and organometallic compounds especially tin compounds. Exemplary of tertiary amine compounds include N,N-dimethylcyclohexylamine, N,N-dimethylbenzylamine, N,N-dimethylethanolamine, bis(dimethylaminoethyl)ether and 1,4-diazobicyclo-[2,2,2]octane; of tin compounds include stannous octoate and dibutyltin dilaurate. Combinations of amine and/or tin compounds as catalyst may advantageously be present. When it is desired to impart a degree of flame retardancy to the polyurethane foam antimony-, phosphorus- or nitrogen-containing substances including, for example, melamine, tris(chloroethyl)-phosphonate or preferably halogen-free phosphorus compounds including for example triethylphosphate, can be used as catalysts.

When preparing a polyurethane foam according to this invention, the polyisocyanate is contacted under reaction conditions with the polyol composition in the presence of the blowing agent and, optionally, the particulate organic polymer. Advantageously, the polyol composition, blowing agent and optional particulate organic polymer may be preblended prior to reacting with polyisocyanate. Suitable manufacturing procedures for packaging foam, including further description of optional additives that advantageously may be present, are such as described in, for example, "Polyurethanes Handbook" by Günter Oertel, Hanser Publishers, Munich, ISBN 0-02-948920-2 (1985); "Reaction Polymers" by W. Gum et al., Hanser Publishers, Munich, ISBN 3-446-15690-9 (1992).

The invention is illustrated by the following examples in which all parts and percentages are by weight, unless otherwise stated. Where reported, properties of foams as obtained are observed according to the following test procedures, for:

| | |
|---|---|
| Density | ISO 845-88 |
| Compression Load Deflection | ISO 3386.1-86 |
| Indentation Load Deflection | ISO 2439.80 |
| Tensile Strength | ISO 1798-83 |
| Elongation | ISO 1798-83 |
| Tear Strength | ASTM D 3574-86 |
| Resilience | ASTM D 3574-86 |
| Air Flow | ASTM D 3574-86 |
| Compression Set | ISO 1856-80 |
| G-value | BS7539 (1992) |

The following listed substances are used to prepare polyurethane foam in the examples.

| | |
|---|---|
| Polyol A | VORANOL CP 1000, a glycerine-initiated polyoxypropylene polyol with an equivalent weight of about 330, available from The Dow Chemical Company. |
| Polyol B | VORANOL CP 1421, a glycerine-initiated polyoxypropylene-oxyethylene (about 70 wt %) polyether polyol with an equivalent weight of about 1670, available from The Dow Chemical Company. |
| Polyol C | VORALUX HN201, a glycerine-initiated polyoxypropylene-oxyethylene polyol with an equivalent weight of about 1870, containing about 21 wt % particulate styrene-acrylonitrile polymer, available from The Dow Chemical Company. |
| Isocyanate A | A crude methylene diphenylisocyanate with an NCO content of about 31 wt %, a polymethylene polyphenylisocyanate content of about 60 wt %, and an average NCO functionality of about 2.7. |
| Catalyst A | DABCO 33LV, a proprietary triethylenediamine-based catalyst available from Air Products. |
| Catalyst B | NIAX A-1, a proprietary bis(n,n-dimethylaminoethyl ether-based catalyst, available from OSi Specialities Inc. |
| Catalyst C | Stannous Octoate. |
| Surfactant A | TEGOSTAB BF 2370, a proprietary silicone-based surfactant available from Th Goldschmidt AG. |

Example 1

Polyurethane foam is prepared using a Hennecke UBT high pressure mixing/dispensing unit operating at a polyol output of about 35 kg/min with all component streams at a temperature of about 20° C. The formulation used to prepare the foams and the observed physical properties of the resulting foams are reported below in Table I.

TABLE I

| parts by weight | Foam 1 | Foam 2 | Foam 3 | Foam 4 | Foam 5 | Foam 6 | Foam 7 | Foam 8 | Foam 9 |
|---|---|---|---|---|---|---|---|---|---|
| Polyol A | 40 | 40 | 40 | 40 | 40 | 40 | 40 | 40 | 50 |
| Polyol B | 50 | 50 | 50 | 50 | 50 | 50 | 50 | 50 | 50 |
| Polyol C | 10 | 10 | 10 | 10 | 10 | 10 | 10 | 10 | / |
| Surfactant A | 1.2 | 1.2 | 1.2 | 1.2 | 1.2 | 1.2 | 1.2 | 1.2 | 1.2 |
| Catalyst A | 0.2 | 0.2 | 0.2 | 0.2 | 0.2 | 0.2 | 0.2 | 0.2 | 0.2 |
| Catalyst B | 0.1 | 0.1 | 0.1 | 0.1 | 0.1 | 0.1 | 0.1 | 0.1 | 0.1 |
| Catalyst C | 0.2 | 0.2 | 0.2 | 0.2 | 0.2 | 0.2 | 0.2 | 0.3 | 0.2 |
| Water | 3.5 | 3.5 | 3.5 | 4.0 | 4.0 | 4.0 | 4.5 | 4.5 | 4.0 |
| Polyisocyanate A | 79.3 | 82.9 | 86.5 | 87 | 91 | 95 | 94.7 | 99 | 75.1 |
| index | 110 | 115 | 120 | 110 | 115 | 120 | 110 | 115 | 90 |
| Density (kg/m$^3$) | 38.6 | 38.1 | 39.9 | 35.7 | 37.1 | 37.0 | 30.7 | 31.6 | 30.9 |
| Airflow (ft$^3$/min) | 1.04 | 1.67 | 1.07 | 1.17 | 1.22 | 1.40 | 0.74 | 1.67 | 4.1 |
| Resilience (%) | 18.5 | 19 | 22.5 | 18.5 | 20.5 | 22.0 | 24.0 | 23.5 | 10 |
| Tensile Strength (kPa) | 140 | 131 | 129 | 173 | 157 | 185 | 130 | 162 | 113 |
| Elongation | 35.8 | 35.4 | 30.7 | 39.3 | 27 | 26.5 | 33.9 | 26.5 | 69 |
| Tear Strength (N/m) | 154 | 162 | 123 | 209 | 131 | 132 | 143 | 147 | 418 |
| CLD, 40% (kPa) | 16.8 | 16.5 | 18.4 | 17.5 | 20 | 24.4 | 17.3 | 22.7 | 7.3 |
| ILD 40% (N) | 550 | 538 | 598 | 568 | 655 | 748 | 593 | 778 | / |
| ILD 65%/25% | 3.34 | 3.39 | 3.63 | 3.65 | 4.05 | 4.01 | 3 77 | 3.73 | / |

Example 2

The G-value, or deceleration performance, of foams as prepared in Example 1 are observed according to test procedure BS 7539 (1992) Section 2, Method 1. The performance is observed for foam samples having a thickness of 75 millimeters with a drop height of 900 millimeters at a static stress of 0.25, 0.5, 0.75, 1.0, 1.25 and 1.5 psi. The observed G-values are reported in Table II.

The low G-value, particularly at a higher static stress, exhibited by foam of this invention renders it particularly suitable for use in the packaging industry and especially packaging of light weight fragile articles. By "light weight" it is typically understood articles having a mass of less than about 5 kg.

TABLE II

| | Observed G-values | | | | | | | |
|---|---|---|---|---|---|---|---|---|
| static stress (psi) | Foam 1 | Foam 2 | Foam 3 | Foam 4 | Foam 5 | Foam 6 | Foam 7 | Foam 8 |
| 0.25 | 39 | 36 | 38 | 45 | 41 | / | / | 36 |
| 0.5 | 24 | 25 | 24 | 26 | 22 | 32 | / | 25 |
| 0.75 | 21 | 20 | 23 | 20 | 20 | 27 | / | 25 |
| 1.0 | 22 | 22 | 22 | 22 | 19 | 22 | / | 26 |
| 1.25 | / | / | / | / | / | 22 | / | / |
| 1.5 | / | / | / | / | / | 26 | / | / |

The results indicate that foams of the invention exhibit a low G-value over a wide range of static stress. By way of comparison, for a conventional high load bearing flexible slabstock foam having a density of 35 kg/m$^3$ the following performance is observed:

| Static Stress (psi) | 0.025 | 0.05 | 0.1 | 0.2 | 0.3 | 0.4 | 0.5 |
|---|---|---|---|---|---|---|---|
| G-value | 53 | 34 | 34 | 32 | 70 | 80 | 110 |

It is further observed for foam of the invention that, if for the same foam sample the G-value is again observed over a multiple (3) of drops that only increase of from 5 to 10 units is observed. In contrast, the flexible slabstock foam does not exhibit such minimal G-value increases. A minimal increase in the G-value permits such foam to be repeatedly used as a packaging material as it still exhibits sufficient shock and vibration attenuation capability to minimize damage of a packaged article.

What is claimed is:

1. A process for preparing a cellular polyurethane polymer having an open or interconnecting cellular structure, an overall density of from about 20 to about 40 kg/m$^3$ and, based on a thickness of 75 mm, a G-value of about 75 or less at a static stress greater than or equal to about 0.4 psi (2.75 kPa), which comprises reacting a polyisocyanate with a polyether polyol composition in the presence of water, wherein:

(a) the polyether polyol composition, based on total parts by weight of (i) and (ii) present, comprises:
(i) from about 25 to about 65 percent of a polyether polyol that has an average of from about 2 to about 4 hydroxyl groups/molecule and an equivalent weight of from about 150 to about 500; and
(ii) from about 35 to about 75 percent, of a polyether polyol that has an average of from about 2 to about 6 hydroxyl groups/molecule, an equivalent weight of from about 600 to about 3,000, and an oxyethylene content of at least 50 weight percent;

(b) the water is present in an amount of from about 1 to about 8 parts per 100 parts by weight of the polyether polyol composition;

(c) the polyisocyanate, being present in an amount sufficient to provide an isocyanate reaction index of from about 50 to about 150, has an average isocyanate-functionality of from about 2.3 to about 3.5 and comprises methylene diphenylisocyanate and at least 40 weight percent polymethylene polyphenyl-isocyanate.

2. The process of claim 1 wherein the polyisocyanate has an average functionality of from about 2.5 to about 3.1 and comprises at least 50 weight percent polymethylene polyphenylisocyanate.

3. The process of claim 1 wherein the polyether polyol composition comprises from about 35 to about 60 percent of (i) which has an equivalent weight of from about 350 to about 400.

4. The process of claim 3 wherein the polyether polyol compositions comprises from about 40 to about 65 percent of (ii) which has an equivalent weight of from about 1,000 to about 2,500 and an oxyethylene content of at least 60 percent.

5. The process of claim 1 wherein the polyether polyol composition further comprises: (iii) from about 0.5 to about 15 percent, based on total weight of the composition, of a particulate organic polymer.

6. The process of claim 5 wherein the particulate organic polymer is a styrene/acrylonitrile, a polyurea or a polyisocyanate/polyamine polymer.

7. The process of claim 5 wherein the particulate organic polymer is a styrene/butadiene polymer.

8. The process of claim 1 wherein the water is present in an amount of from about 2.5 to about 6.5 parts per 100 parts of the polyether polyol composition.

9. The process of claim 8 wherein the polyisocyanate is present in an amount sufficient to provide an isocyanate reaction index of from about 70 to about 120.

10. A method for packaging fragile articles with a cellular, shock absorbing polymer material wherein the polymer material used is an open-celled polyurethane foam having an overall density of from about 20 to about 40 kg/m$^3$ and, based on a thickness of 75 mm, a G-value of about 75 or less at a static stress greater than or equal to about 0.4 psi (2.75 kPa).

11. The method of claim 1 wherein the fragile article has mass of less than about 5 kg.

12. A method for packaging fragile articles with a cellular, shock absorbing material wherein the material used is a polyurethane foam obtained according to the process of claim 1.

* * * * *